United States Patent
Breiner et al.

(10) Patent No.: US 6,812,323 B1
(45) Date of Patent: Nov. 2, 2004

(54) INHERENTLY LIGHT- AND HEAT-STABILIZED POLYAMIDES WITH IMPROVED WET FASTNESS

(75) Inventors: Ulrike Breiner, Bürstadt (DE); Manfred Julius, Limburgerhof (DE); Rainer Neuberg, Dannstadt-Schauernheim (DE); Robert Weiss, Kirchheim (DE); Axel Wilms, Weisenheim (DE); Harry Y. Hu, Arden, NC (US)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/646,183
(22) PCT Filed: Mar. 18, 1999
(86) PCT No.: PCT/EP99/01794
§ 371 (c)(1),
(2), (4) Date: Sep. 14, 2000
(87) PCT Pub. No.: WO99/48949
PCT Pub. Date: Sep. 30, 1999

(30) Foreign Application Priority Data

Mar. 20, 1998 (DE) .......................... 198 12 135

(51) Int. Cl.$^7$ .................................. C08G 69/28
(52) U.S. Cl. .................. 528/314; 528/323; 528/336; 524/99; 524/100; 524/102; 524/103
(58) Field of Search ................... 528/314, 323, 528/336; 524/99–100, 102–103, 104

(56) References Cited

U.S. PATENT DOCUMENTS

| | | | |
|---|---|---|---|
| 3,386,967 A | * 6/1968 | Twilley | |
| 3,684,765 A | * 8/1972 | Matsui et al. | 546/242 |
| 3,839,530 A | * 10/1974 | Bingham et al. | |
| 4,223,147 A | * 9/1980 | Oertel et al. | 546/242 |
| 4,234,700 A | 11/1980 | Rody et al. | |
| 5,149,758 A | * 9/1992 | Matthies | |
| 5,541,267 A | * 7/1996 | Akkapeddi et al. | 525/432 |
| 5,547,765 A | * 8/1996 | Degrassi et al. | 428/474.7 |
| 5,597,888 A | * 1/1997 | Nielinger et al. | |
| 5,618,909 A | * 4/1997 | Lofquist et al. | 528/323 |
| 5,714,612 A | * 2/1998 | Kimura et al. | 546/190 |
| 5,763,561 A | * 6/1998 | Keske | |
| 5,814,107 A | * 9/1998 | Gadoury et al. | 8/442 |
| 5,851,238 A | * 12/1998 | Gadoury et al. | |
| 5,917,004 A | * 6/1999 | Liedloff | 528/332 |
| 5,932,640 A | 8/1999 | Kaul et al. | |
| 6,136,433 A | * 10/2000 | McIntosh et al. | |
| 6,150,496 A | * 11/2000 | Ilg et al. | 528/332 |

FOREIGN PATENT DOCUMENTS

| | | |
|---|---|---|
| CA | 2187821 | 10/1995 |
| DE | 32 33 953 | 3/1984 |
| DE | 39 01 717 | 7/1990 |
| DE | 43 03 138 | 8/1994 |
| DE | 44 13 177 | 10/1995 |
| EP | 332 761 | 9/1989 |
| WO | 91/03511 | 3/1991 |
| WO | 0345648 B1 | * 9/1995 |
| WO | WO 05/28443 | * 10/1995 |
| WO | 95/28443 | 10/1995 |
| WO | 97/05189 | 2/1997 |
| WO | 97/13800 | 4/1997 |
| WO | 97/49751 | 12/1997 |

OTHER PUBLICATIONS

Austenal Laboratories, Incorporated v. Nobilium Company of Chicago et al. (DC N. ILL) 115 USPQ 44, 1957.*
Petrolite Corporation v. Watson, Comr. Pats. (DC DC) 113 USPQ 248, 1957.*
Handbuch der techn.Polymerchemie,1993, 553.

* cited by examiner

*Primary Examiner*—Peter Szekely
(74) *Attorney, Agent, or Firm*—Keil & Weinkauf

(57) ABSTRACT

A process for preparing polyamides comprises polymerizing starting monomers or starting oligomers in the presence of at least one compound of the formula (I)

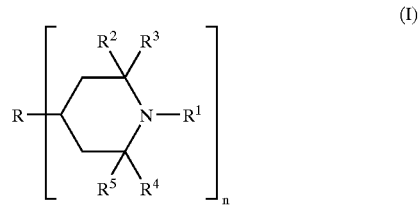

where
R is a functional group $R^8$ which bears 1–4 identical or different amide-forming groups $R^7$,
$R^1$ is H, $C_1$–$C_{20}$-alkyl, cycloalkyl, benzyl or $OR^6$, where $R^6$ is H, $C_1$–$C_{20}$-alkyl, cycloalkyl or benzyl,
$R^2$, $R^3$, $R^4$ and $R^5$ are independently $C_1$–$C_{10}$-alkyl,
n is a natural number greater than 1, and
the piperidine derivatives attached to R are identical or different with regard to the substituents, meaning $R^1$, $R^2$, $R^3$, $R^4$ and $R^5$.

The polyamides are useful for preparing filaments, fibers, films, sheetlike structures and moldings.

17 Claims, No Drawings

INHERENTLY LIGHT- AND HEAT-STABILIZED POLYAMIDES WITH IMPROVED WET FASTNESS

The present invention relates to a process for preparing polyamides, which comprises polymerizing starting monomers or starting oligomers in the presence of at least one compound of the formula (I)

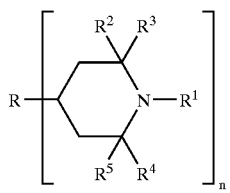

where
R is a functional group $R^8$ which bears 1–4 identical or different amide-forming groups $R^7$,
$R^1$ is H, $C_1$–$C_{20}$-alkyl, cycloalkyl, benzyl or $OR^6$, where $R^6$ is H, $C_1$–$C_{20}$-alkyl, cycloalkyl or benzyl,
$R^2$, $R^3$, $R^4$ and $R^5$ are independently $C_1$–$C_{10}$-alkyl,
n is a natural number greater than 1, and
the piperidine derivatives attached to R are identical or different with regard to the substituents, meaning $R^1$, $R^2$, $R^3$, $R^4$ and $R^5$.

It further relates to polyamides obtainable by this process, to the use of such polyamides for preparing filaments, fibers, films, sheetlike structures and moldings, and to filaments, fibers, films, sheetlike structures and moldings comprising such a polyamide.

The preparation of polyamides, including nylon-6 and nylon-6,6, by addition or condensation polymerization from appropriate starting monomers or starting oligomers is common knowledge (Adolf Echte, Handbuch der technischen Polymerchemie, VCH Weinheim, 1993, p. 553).

The application properties of such polyamides, such as heat stability, light stability, dyeability, resistance to the washing out of color (color wetfastness), are unsatisfactory for many applications.

For instance, coloration problems can arise as a result of chemical changes (oxidative/thermal damage) to the polymer during carpet yarn or textile fabric heat setting. Both continuous filaments and staple fibers can be affected.

It is known to add stabilizers to the polyamide to improve these properties. Such an addition can take place before, during or after the polymerization, for example during the processing.

If the stabilizers are mixed into the polyamide and not attached to the polymer chain, they can migrate, evaporate or wash out of the polymer, so that the effectiveness of the stabilization decreases in an undesirable manner and the surroundings (air, dyebath, cleaning baths) may become contaminated. For instance, DE-A-39 01 717 describes improving the dyeability of polyamides by adding small amounts of at least one amino or imino compound having a cycloalkyl, aryl or hetaryl moiety in the molecule.

The addition of 2,2,6,6-tetramethylpiperidine derivatives with an amide-forming group in position 4 and with or without substitution in position 1 during the polymerization is described for example in WO 95/28443, DE-A-44 13 177, WO 97/05189 and Wo 97/13800. The use of these stabilizers leads to a reduction in the rate of polymerization and hence to higher manufacturing costs for the polyamides due to a reduced space-time yield. In addition, the wetfastness of such polyamides is unsatisfactory.

It is an object of the present invention to provide a process for preparing polyamides, polyamides obtainable by this process, the use of such polyamides for preparing filaments, fibers, films, sheetlike structures and moldings, and also filaments, fibers, films, sheetlike structures and moldings comprising such a polyamide without the disadvantages mentioned.

We have found that this object is achieved by the process for preparing polyamides defined at the beginning, polyamides obtainable by this process, the use of such polyamides for preparing filaments, fibers, films, sheetlike structures and moldings, and also filaments, fibers, films, sheetlike structures and moldings comprising such a polyamide.

Polyamides are herein to be understood as being homopolymers, copolymers, blends and grafts of synthetic long-chain polyamides having recurring amide groups in the polymer main chain as an essential constituent. Examples of such polyamides are nylon-6 (polycaprolactam), nylon-6,6 (polyhexamethyleneadipamide), nylon-4,6 (polytetramethyleneadipamide), nylon-6,10 (polyhexamethylenesebacamide), nylon-7 (polyenantholactam), nylon-11 (polyundecanolactam), nylon-12 (polydodecanolactam). As well as polyamides known by the generic name of nylon, polyamides further include the so-called aramids (aromatic polyamides), such as poly-meta-phenylene-isophthalamide (NOMEX® fiber, U.S. Pat. No. 3,287,324) or poly-para-phenylene-terephthalamide (KEVLAR® fiber, U.S. Pat. No. 3,671,542).

Polyamides can in principle be prepared by two methods.

In a polymerization from dicarboxylic acids and diamines and also in a polymerization from amino acids, the amino and carboxyl end groups of the starting monomers or starting oligomers react with one another to form an amide group and water. The water can subsequently be removed from the polymer. In a polymerization from carboxamides, the amino and amide end groups of the starting monomers or starting oligomers react with one another to form an amide group and ammonia. The ammonia can subsequently be removed from the polymer. This form of polymerization is customarily known as a condensation polymerization or polycondensation.

A polymerization from lactams as starting monomers or starting oligomers is customarily known as an addition polymerization.

Suitable starting monomers or starting oligomers for preparing polyamides are for example:

monomers or oligomers of $C_2$ to $C_{20}$, preferably $C_3$ to $C_{18}$, amino acids, such as 6-aminocaproic acid, 11-aminoundecanoic acid, and also their dimers, trimers, tetramers, pentamers or hexamers, monomers or oligomers of $C_2$ to $C_{20}$ amino acid amides, such as 6-aminocaproamide, 11-aminoundecanoamide, and also their dimers, trimers, tetramers, pentamers or hexamers, monomers or oligomers of a $C_2$ to $C_{20}$, preferably $C_2$ to $C_{12}$, alkyldiamine, such as tetramethylenediamine or preferably hexamethylenediamine, with a $C_2$ to $C_{20}$, preferably $C_2$ to $C_{14}$, aliphatic dicarboxylic acid, such as sebacic acid, decanedicarboxylic acid or adipic acid, and also dimers, trimers, tetramers, pentamers or hexamers thereof, monomers or oligomers of a $C_2$ to $C_{20}$, preferably $C_2$ to $C_{12}$, alkyldiamine, such as tetramethylenediamine or preferably hexamethylenediamine, with a $C_8$ to $C_{20}$, preferably $C_8$ to $C_{12}$, aromatic dicarboxylic acid or its derivatives, for example chlorides, such as 2,6-naphthalenedicarboxylic acid, preferably isophthalic acid or terephthalic acid, and also its dimers, trimers, tetramers, pentamers or hexamers, monomers or oligomers of a $C_2$ to $C_{20}$, preferably $C_2$ to $C_{12}$, alkyldiamine, such as tetramethylenediamine or preferably hexamethylenediamine, with a $C_9$ to $C_{20}$, preferably $C_9$ to $C_{18}$, arylaliphatic dicarboxylic acid or its derivatives, for example chlorides, such as o-, m- or p-phenylenediacetic acid, and also its dimers, trimers, tetramers, pentamers or hexamers, monomers or oligomers of a $C_6$ to $C_{20}$, preferably $C_6$ to $C_{10}$, aromatic diamine, such as m- or p-phenylenediamine, with a $C_2$ to $C_{20}$, preferably $C_2$ to $C_{14}$, aliphatic dicarboxylic acid, such as sebacic acid, decanedicarboxylic acid or adipic acid, and also its dimers, trimers, tetramers, pentamers or hexamers, monomers or oligomers of a $C_6$ to $C_{20}$, preferably $C_6$ to $C_{10}$, aromatic diamine, such as m- or p-phenylenediamine, with a $C_8$ to $C_{20}$, preferably $C_8$ to $C_{12}$, aromatic dicarboxylic acid or its derivatives, for example chlorides, such as 2,6-naphthalenedicarboxylic acid, preferably isophthalic acid or terephthalic acid, and also its dimers, trimers, tetramers, pentamers or hexamers, monomers or oligomers of a $C_6$ to $C_{20}$, preferably $C_6$ to $C_{10}$, aromatic diamine, such as m- or p-phenylenediamine, with a $C_9$ to $C_{20}$, preferably $C_9$ to $C_{18}$, arylaliphatic dicarboxylic acid or its derivatives, for example chlorides, such as o-, m- or p-phenylenediacetic acid, and also its dimers, trimers, tetramers, pentamers or hexamers, monomers or oligomers of a $C_7$ to $C_{20}$, preferably $C_8$ to $C_{10}$, arylaliphatic diamine, such as m- or p-xylylenediamine, with a $C_2$ to $C_{20}$, preferably $C_2$ to $C_{14}$, aliphatic dicarboxylic acid, such as sebacic acid, decanedicarboxylic acid or adipic acid, and also its dimers, trimers, tetramers, pentamers or hexamers, monomers or oligomers of a $C_7$ to $C_{20}$, preferably $C_8$ to $C_{18}$, arylaliphatic diamine, such as m- or p-xylylenediamine, with a $C_6$ to $C_{20}$, preferably $C_6$ to $C_{10}$, aromatic dicarboxylic acid or its derivatives, for example chlorides, such as 2,6-naphthalenedicarboxylic acid, preferably isophthalic acid or terephthalic acid, and also its dimers, trimers, tetramers, pentamers or hexamers, monomers or oligomers of a $C_7$ to $C_{20}$, preferably $C_8$ to $C_{18}$, arylaliphatic diamine, such as m- or p-xylylenediamine, with a $C_9$ to $C_{20}$, preferably $C_9$ to $C_{18}$, arylaliphatic dicarboxylic acid or its derivatives, for example chlorides, such as o-, m- or p-phenylenediacetic acid, and also its dimers, trimers, tetramers, pentamers or hexamers, monomers or oligomers of a $C_2$ to $C_{20}$, preferably $C_2$ to $C_{18}$, arylaliphatic or preferably aliphatic lactam, such as enantholactam, undecanolactam, dodecanolactam or caprolactam, and also homopolymers, copolymers, blends and grafts of such starting polymers or starting oligomers.

Preference is given here to those starting monomers or starting oligomers which polymerize to form the polyamides nylon-6, nylon-6,6, nylon-4,6, nylon-6,10, nylon-7, nylon-11, nylon-12 and the aramids poly(meta-phenyleneisophthalamide) or poly(paraphenyleneterephthalamide), especially nylon-6 and nylon-6,6.

In the compound of the formula (I), R is a functional group bearing 1–4 identical or different amide-forming groups $R^7$.

R is suitably a $C_1$ to $C_{20}$, preferably $C_6$ to $C_{18}$, aromatic, preferably aliphatic unsaturated, preferably saturated, hydrocarbon $R^8$ bearing the 1–4 amide-forming groups $R^7$.

The hydrocarbons $R^8$ can bear functional groups, such as ether groups, non-amide-forming amine groups or acid groups, such as phosphonic acid, phosphoric acid, preferably sulfonic acid groups or their derivatives, preferably salts, especially alkali metal salts, such as lithium, sodium or potassium salts.

In a preferred embodiment of the process of the present invention, $R^8$ is $C_1$–$C_{20}$-alkylene, especially hexamethylene, having no further functional groups apart from $R^7$.

The amide-forming group $R^7$ can be selected from —(NHR$^9$), where $R^9$ is H, alkyl having from 1 to 8 carbon atoms, cycloalkyl having from 3 to 10 carbon atoms or alkylene having from 2 to 20 carbon atoms, carboxyl, a carboxyl derivative group or preferably —(NH)—. If R bears a plurality of groups $R^7$, these groups can be different or preferably identical.

$R^1$ is suitably alkyl having from 1 to 20, preferably from 1 to 18, carbon atoms, a substituted or preferably unsubstituted benzyl group or a group $OR^6$, where $R^6$ is an alkyl group having from 1 to 20, preferably from 1 to 18 carbon atoms, a substituted or preferably unsubstituted benzyl group or preferably hydrogen. $R^1$ is particularly preferably hydrogen.

Suitable radicals $R_1$ $R^3$, $R^4$ and $R^5$ are independently alkyl having from 1 to 10 carbon atoms, preferably methyl or ethyl, especially methyl. $R^2$, $R^3$, $R^4$ and $R^5$ can be different or preferably identical.

The index n can be a natural number greater than 1, such as 2, 3, 4, 5 or 6, preferably 2, 3 or 4, especially 2.

The piperidine derivatives attached to R can be identical or different, preferably identical.

Compound (I) can be a single chemical compound or a mixture of different compounds.

A particularly preferred compound of the formula (I) is 1,6-bis-(4-amino-2,2,6,6-tetramethylpiperidino)hexane. This compound and its preparation are common knowledge and it is commercially available for example from Aldrich Chemical Company, Inc.

The compound of the formula (I) is added to the starting monomers or to the polymerizing reaction mixture and becomes attached to the polyamide through reaction of at least one of the amide-forming groups $R^7$. The secondary amino groups of the piperidine ring systems do not react because of steric hindrance.

By chemically attaching the compound (I) to or within a polyamide, the process of the present invention provides polyamides having the advantageous properties mentioned at the beginning. The process of the present invention thus offers the advantage of obviating the separate step otherwise necessary to improve the properties of pure polyamides by admixture of compounds. This eliminates problems or quality reductions as can arise on incorporation of such compounds following surface application to the polymer granules as a result of incompatibility, viscosity degradation, migration, vaporization or washoff of these compounds or stresses as occur with compounding.

The polymerization of the starting monomers in the presence of the compound (I) is preferably carried out according to customary processes. For instance, the polymerization of caprolactam in the presence of a compound (I) can be carried out for example according to the continuous or batchwise processes described in DE-A 14 95 198, DE-A 25 58 480, DE-A 44 13 177, Polymerization Processes, Interscience, New York, 1977, p. 424–467 and Handbuch der Technischen Polymerchemie, VCH Verlagsgesellschaft, Weinheim, 1993, p. 546–554. The polymerization of 66 salt in the presence of a compound (I) can be carried out by the customary batchwise process (see: Polymerization Processes, Interscience, New York, 1977, p. 424–467, especially 444–446) or by a continuous process, for example as described in EP-A 129 196. In principle, compound (I) and the starting monomers can be introduced into the reactor separately or as a mixture. The compound (I) is preferably added according to a predetermined amount/time program.

In a preferred embodiment, the compound (I) is added to the starting monomers in an amount of from 0.015 to 0.4 mol %, preferably from 0.025 to 0.25 mol %, based on 1 mol of amide groups of the polyamide. This amount is based for example on 1 mol of caprolactam when nylon-6 is to be prepared or on 0.5 mol of 66 salt when nylon-6,6 is to be prepared.

In a preferred embodiment of the invention, the compound (I) is combined with at least one of the customary chain regulators. Examples of suitable chain regulators are aliphatic and aromatic monocarboxylic acids such as acetic acid, propionic acid and benzoic acid, aliphatic and aromatic dicarboxylic acids such as $C_4$–$C_{10}$-alkanedicarboxylic acids, preferably sebacic acid and dodecanedioic acid, especially adipic acid and azelaic acid, aliphatic $C_5$-$C_8$-cycloalkanedicarboxylic acids, especially cyclohexane-1,4-dicarboxylic acid, aromatic dicarboxylic acids such as benzene- and naphthalene-dicarboxylic acids, preferably isophthalic acid, 2,6-naphthalenedicarboxylic acid, especially terephthalic acid, monofunctional amines and bifunctional amines, preferably hexamethylenediamine or cyclohexyldiamine and also mixtures of such acids and mixtures of such amines. The chain regulator combination and the amounts used are selected inter alia according to the desired polymer properties, such as viscosity or end group content. When dicarboxylic acids are used as chain regulators, it is preferable to use the chain regulator in an amount of from 0.06 to 0.6 mol %, preferably in an amount of from 0.1 to 0.5 mol %, based on 1 mol of amide group of the polyamide.

In another preferred embodiment, the polymerization of the process of the present invention is carried out in the presence of at least one pigment. Preferred pigments are titanium dioxide, preferably titanium dioxide in the anatase form, or color-conferring compounds which are organic or inorganic in character. The pigments are preferably added in an amount of from 0 to 5 parts by weight, especially in an amount from 0.02 to 2 parts by weight, based on 100 parts by weight of polyamide. The pigments can be added to the reactor with the starting materials or separately therefrom. The use of a compound (I) (even as a chain regulator constituent) considerably improves the properties of the polymer compared with a polymer incorporating only pigment and no compound (I) or only pigment and one of the 2,2,6,6-tetramethylpiperidine derivatives mentioned at the beginning.

The polyamides of the present invention are advantageously useful for preparing filaments, fibers, films, sheet-like structures and moldings. Filaments obtained from polyamides, especially polycaprolactam, by high speed spinning at takeoff speeds of at least 4000 m/min are particularly advantageous. The filaments, fibers, films, sheetlike structures and moldings obtained using the polyamides of the present invention have many uses, for example as textile apparel or carpet fibers.

EXAMPLES

The relative viscosity of the polyamides was determined in 1% strength solution (1 g/100 ml) in concentrated sulfuric acid (96% by weight) at 25° C.

The end group content was determined by acidimetric titration. The amino end groups were titrated with perchloro [sic] acid in a solution in 70:30 (parts by weight) phenol/methanol. The carboxyl end groups were titrated with potassium hydroxide solution in a solution in benzyl alcohol.

To determine the color wetfastness, yarns were knitted up, then heat-set, dyed, treated with dye fixative and dried. The color fastness was determined in accordance with ISO-EO1:1994 (water fastness, severe).

The heat setting was carried out in a tenter at 196° C. for 45 sec. The knit was then dyed in hot water (98° C.) with a mixture of 2.53% by weight of Telon Fast Red AF3G 150% (corresponding to 3.8% of Acid Red 151) and 0.50% by weight of Acid Rhodamine B 400% (corresponding to 2% of Acid Red 52) at pH 3.5. To improve the dye fixation, the knit was treated for 30 min in a solution of 2% by weight of mesitol NBS at 77° C. in water and then rinsed out with 40 water. After drying, the color fastness test was carried out. To this end, a sample of the fabric was moistened and placed between two pieces of undyed standard cloth. The three-ply stack was weighted with a standard weight and kept at 37° C. for 4 h. The fastness was evaluated by comparing the depths of shade of the stained adjacent fabric with a standard gray scale.

The UV stability of the yarns was determined in accordance with DIN 54004 (ISO 105 B 02) after 14 days' irradiation and subsequent measurement of the residual strength compared with an untreated sample.

To determine the heat-setting stability, a 5 g hank was aged for 120 sec in a thermal cabinet preheated to 185° C. Subsequently the breaking strength of the yarn was determined in comparison with an untreated yarn and reported as residual breaking strength [%].

The condensation potential was determined from the product of condensation-capable amino end groups and carboxyl end groups.

Preparation of polyamides (a)

In a 360 l vessel, a mixture of 100 kg of caprolactam, 15 kg of water and the additives of Table 1 (reported quantities in % by weight based on caprolactam) was heated to 260° C. in the course of 2 hours. After decompression over 90 min, the mixture was postcondensed at 260° C. for 45 min.

The product was then pelletized, divided into two portions and each being extracted three times with 100 l of water at 100° C. in a 100 l vessel for 5 hours at a time, and dried in a tumble dryer at 160° C. under nitrogen.

The polymers were spun on a high speed spinning machine (Ems-Inventa AG) by the H4S process at 270° C. and with a winding speed of 5040 m/min to 44 dtex 12 filament yarn of round cross section. The takeoff speed was 4300 m/min (duo 1), the draw ratio was 1:1.28 (duo 2=5500 m/min) and the yarn tension upstream of the winder was 3 cN. The steam box was operated with 3 bar process steam, and the spin finish content of the yarn was 0.8%. The yarns had the following properties: elongation 42%, tenacity 35 5.2 cN/dtex, boiling water shrinkage 14%.

The properties of the polyamides are summarized in Table 2. The polyamides of the present invention have improved light and heat stability and also improved wetfastness over the comparative polyamides.

TABLE 1

| Additive | Terephthalic acid | 4-Amino-2,2,6,6-tetramethyl-piperidine | 1,6-bis(4-Amino-2,2,6,6-tetramethylpiperidino)-hexane |
|---|---|---|---|
| Inventive Example 1 | 0.6 | –/– | 0.7 |
| Inventive Example 2 | 0.6 | –/– | 0.5 |
| Comparative Example 1 | 0.5 | 0.3 | –/– |

TABLE 2

| Product | RV | AEG | CEG | CP | UV stab. | Heat-set. stab. | Color wetfastn. |
|---|---|---|---|---|---|---|---|
| Inv. 1 | 2.47 | 71 | 74 | 2945 | 79 | 90 | 4.4 |
| Inv. 2 | 2.38 | 63 | 87 | 2440 | 74 | 75 | 3.7 |
| Comp. 1 | 2.43 | 41 | 77 | 1925 | 73 | 73 | 3.6 |

| | |
|---|---|
| RV | Relative viscosity |
| AEG | Amino end group content in meq/kg |
| CEG | Carboxyl end group content in meq/kg |
| KP | Condensation potential |
| UV stab. | UV stability, residual ultimate tensile strength in % |
| Heat-set. stab. | Heat-setting stability, residual tensile strength in % |
| Color wetfastn. | Wetfastness, AATCC gray scale |

Preparation of Polyamides (b)

The mixtures of Table 3 were sealed in a glass tube under a nitrogen atmosphere. The sealed tube was heated to 260° C. for the reaction times of Table 4. The products had the RV values of Table 4.

TABLE 3

| Inv. 3 | Comp. 2 |
|---|---|
| 50 g of caprolactam | 50 g of caprolactam |
| 0.285 g of terephthalic acid | 0.285 g of terephthalic acid |
| 25 ml of water | 25 ml of water |
| 0.140 g of 1,6-bis(4-amino-2,2,6,6-tetramethylpiperidino)hexane | 0.354 g of 4-amino-2,2,6,6-tetramethylpiperidine |
| (0.2 mol % based on caprolactam) | (0.2 mol % based on caprolactam) |

TABLE 4

| Reaction time [h] | Inv. 3, RV | Inv. 3, AEG | Comp. 2, RV | Comp. 2, AEG |
|---|---|---|---|---|
| 0.5 | 1.20 | | 1.24 | |
| 1.5 | 1.78 | | 1.81 | |
| 3 | 1.98 | | 2.01 | |
| 6 | 1.99 | | 2.08 | |
| 9 | 2.1 | 108 | 2.08 | 70 |

Preparation of Polyamides (c)

A mixture as per Table 5 was [lacuna] to 270° C. for 1 hour in a 1 liter autoclave. After decompression over 45 minutes, the 45 mixture was postcondensed at 260° C. for 60 minutes. The product was then pelletized, extracted with water and dried at 80° C. The results of Table 6 were found.

TABLE 5

| Comp. 3 | Comp. 4 | Inv. 4 |
|---|---|---|
| 300 g of caprolactam | 300 g of caprolactam | 300 g of caprolactam |
| 30 g of water | 30 g of water | 30 g of water |
| 1.68 g of terephthalic acid | 1.68 g of terephthalic acid | 1.68 g of terephthalic acid |
| 0.84 g of 4-amino-2,2,6,6-tetramethylpiperidine (0.2 mol % based on caprolactam) | 1.68 g of 4-amino-2,2,6,6-tetramethylpiperidine (0.4 mol % based on caprolactam) | 2.1 g of 1,6-bis(4-amino-2,2,6,6-tetramethylpiperidino)-hexane (0.2 mol % based on caprolactam) |

TABLE 6

| Comp. 3, RV | Comp. 4, RV | Inv. 4, RV |
|---|---|---|
| 2.40 | 2.32 | 2.47 |

Doubling the regulator content on going from Comp. 3 to Comp. 4, i.e., doubling the number of sterically hindered amino groups in the polymer, slows down the growth in molecular weight and reduces the postcondensation potential of such products. The polymer of the present invention makes it possible to introduce twice the number of sterically hindered amino end groups without reducing the postcondensation potential.

We claim:

1. A process for preparing a fiber-forming polyamide, which comprises
   a) polymerizing starting monomers or starting oligomers in an aqueous reaction medium in the presence of at least one compound of the formula (I)

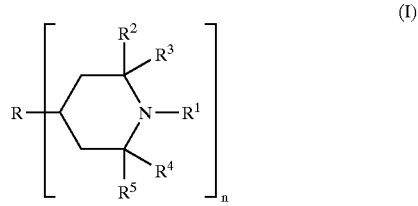

R is a $C_1$–$C_{20}$ aliphatic saturated hydrocarbon $R^8$ which bears 1–4 identical or different amide-forming groups $R^7$,
$R^1$ is H, $C_1$–$C_{20}$-alkyl, cycloalkyl, benzyl or $OR^6$,
$R^6$ is H, $C_1$–$C_{20}$-alkyl, cycloalkyl or benzyl,
$R^7$ is selected from the group consisting of —(NH)—, —(NHR$^9$), carboxyl and carboxyl derivative groups,
$R^9$ is H, alkyl having from 1 to 8 carbon atoms, cycloalkyl having from 3 to 10 carbon atoms or alkylene having from 2 to 20 carbon atoms,
$R^2$, $R^3$, $R^4$ and $R^5$ are independently $C_1$–$C_{10}$-alkyl,
n is a natural number greater than 1,
wherein the piperidine derivatives attached to R are identical or different with regard to the substituents $R^1$, $R^2$, $R^3$, $R^4$ and $R^5$, and
wherein the compound of the formula I is added to the starting monomers or to the polymerizing reaction mixture and becomes attached to the polyamide through reaction of at least one of the amide-forming groups $R^7$, and
allowing the polymerization to proceed until the polyamide exhibits a degree of polymerization which renders the polyamide capable of forming fibers;

b) separating the polyamide from the reaction medium, and c) extracting the separated polyamide.

2. A process as claimed in claim 1, wherein the piperidine derivatives attached to R are identical with regard to the substituents $R^1$, $R^2$, $R^3$, $R^4$ and $R^5$.

3. A process as claimed in claim 1, wherein $R^1$ is H.

4. A process as claimed in claim 1, wherein the $R^2$, $R^3$, $R^4$ and $R^5$ substituents on any one piperidine derivative are identical.

5. A process as claimed in claim 1, wherein $R^2$ on any one piperidine derivative is methyl.

6. A process as claimed in claim 1, wherein n is 2.

7. A process as claimed in claim 1, wherein R is a group of the formula —NH—$R^8$—NH— where $R^8$ is alkylene having from 1 to 20 carbon atoms.

8. A process as claimed in claim 1, wherein R is —NH—$CH_2$—$CH_2$—$CH_2$—$CH_2$—$CH_2$—$CH_2$—NH—.

9. A process as claimed in claim 1, wherein the polymerizing is carried out in the presence of at least one pigment.

10. A polyamide obtainable by a process as claimed in claim 1.

11. A process for preparing filaments and fibers, which process comprises melt spinning a polyamide as claimed in claim 11.

12. Filaments, fibers, films, sheets and moldings comprising a polyamide as claimed in claim 11.

13. The process of claim 1 wherein the hydrocarbon $R^8$ bears groups $R^7$ selected from —(NH)—, —(NHR$^9$) and carboxyl groups.

14. The process of claim 1 wherein the starting monomers or the starting oligomers are selected from the group consisting of:

$C_2$–$C_{20}$-amino acid monomers and their oligomers, $C_2$–$C_{20}$-amino acid amide monomers and their oligomers, combinations of a $C_2$–$C_{20}$-alkyl diamine monomer and a $C_2$–$C_{20}$-aliphatic dicarboxylic acid monomer, and oligomers obtained from such combinations, combinations of a $C_2$–$C_{20}$-alkyl diamine monomer and a $C_8$–$C_{20}$-aromatic dicarboxylic acid monomer or a derivative of the dicarboxylic acid monomer, and oligomers obtained from such combinations, combinations of a $C_2$–$C_{20}$-alkyl diamine monomer and a $C_9$–$C_{20}$ arylaliphatic dicarboxylic acid monomer or a derivative of the dicarboxylic acid monomer, and oligomers obtained from such combinations, combinations of a $C_7$–$C_{20}$ arylaliphatic diamine monomer and a $C_9$–$C_{20}$ arylaliphatic dicarboxylic acid monomer or a derivative of the dicarboxylic acid monomer, and oligomers obtained from such combinations, combinations of a $C_8$–$C_{18}$ arylaliphatic diamine monomer and a $C_6$–$C_{20}$ aromatic dicarboxylic acid monomer or a derivative of the dicarboxylic acid monomer, and oligomers obtained from such combinations, $C_2$–$C_{20}$ aliphatic and arylaliphatic lactam monomers and their oligomers, oligomers obtained from a mixture of two or more of the monomers, and a mixture of two or more of the oligomers.

15. The process of claim 1 wherein the separated polyamide is extracted with water.

16. The process of claim 14 wherein the starting monomers or the starting oligomers are selected from the group consisting of:

$C_2$–$C_{20}$-amino acid monomers and their oligomers, $C_2$–$C_{20}$-amino acid amide monomers and their oligomers, combinations of a $C_2$–$C_{20}$-alkyl diamine monomer and a $C_2$–$C_{20}$-aliphatic dicarboxylic acid monomer, and oligomers obtained from such combinations, $C_2$–$C_{20}$ aliphatic lactam monomers and their oligomers, oligomers obtained from a mixture of two or more of the monomers, and a mixture of two or more of the oligomers.

17. The process of claim 14 wherein the separated polyamide is extracted with water.

* * * * *